United States Patent [19]
Sakamoto et al.

[11] Patent Number: 5,612,790
[45] Date of Patent: Mar. 18, 1997

[54] METHOD AND APPARATUS FOR MULTIPLEXED VIDEO DATA READING IN VIDEO LIBRARY SYSTEM

[75] Inventors: Hideki Sakamoto, Saitamaken; Kazutoshi Nishimura; Hideharu Suzuki, both of Tokyo; Tomoaki Kawaguchi, Saitamaken; Osamu Nakano, Kanagawaken; Tatsuo Mori, Chibaken, all of Japan

[73] Assignee: Nippon Telegraph & Telephone Co., Tokyo, Japan

[21] Appl. No.: 299,749

[22] Filed: Sep. 1, 1994

[30] Foreign Application Priority Data

Sep. 2, 1993 [JP] Japan .................................. 5-218411
May 30, 1994 [JP] Japan .................................. 6-116111

[51] Int. Cl.$^6$ ............................... H04N 5/76; H04N 7/10
[52] U.S. Cl. ............................................................ 386/69
[58] Field of Search ................................. 358/335, 342, 358/310, 311; 360/32, 33.1, 13; 348/6, 7, 8, 12, 13, 16, 17; 455/4.2; H04N 7/10, 7/14, 5/76

[56] References Cited

U.S. PATENT DOCUMENTS 5,353,285 10/1994 Van Der Plas et al. ................... 370/84
5,473,362 12/1995 Fitzgerald et al. ........................... 348/7

FOREIGN PATENT DOCUMENTS 269087 9/1992 Japan .

OTHER PUBLICATIONS

"Designing File Systems for Digital Video and Audio" by P. Venkat Rangan and Harrick M. Vin.
Article from IEEE Communications Magazine, entitled "Designing an On–Demand Multimedia Service", by P. Venkat Ranga, Harrick M. Vin & Srinivas Ramanathan dated Jul. 1992.

"A Disk Array Management System for Video Files" by Fouad A. Tobagi et al.

*Primary Examiner*—Thai Q. Tran
*Assistant Examiner*—Robert Chevarlier
*Attorney, Agent, or Firm*—Banner & Witcoff, Ltd.

[57] ABSTRACT

A video library system capable of shortening the worst response time with respect to each video data reading request, without lowering the possible level of multiplexing. The multiplexed video data reading is achieved by distributedly storing video data divided into segments among a plurality of data storage devices, where each segment is capable of being read out in one time-slot; selectively connecting each data storage devices with one of data transfer targets by a plurality of switches provided in correspondence to the data storage devices; generating a plurality of control time-slot sequences formed by periodic time-slots in correspondence to the data storage devices with mutually displaced phases in each period of the control time-slot sequences; and controlling the data storage devices and switches such that, in response to a request for reading video data from a data transfer target, an earliest available idle time-slot is selected from the control time-slot sequences, and the segments of the requested video data are sequentially read out from the data storage devices at time-slots corresponding to the selected earliest idle time-slot in the control time-slot sequences and transmitted to the requesting data transfer target as the data storage devices are sequentially switched to the requesting data transfer target by the switches.

20 Claims, 10 Drawing Sheets

METHOD AND APPARATUS FOR MULTIPLEXED VIDEO DATA READING IN VIDEO LIBRARY SYSTEM

BACKGROUND OF THE INVENTION

1. Field of the Invention

The present invention relates to a video library system for reading a plurality of video data simultaneously from data storage devices such as disk devices in which many video data including audio data are recorded by being compression coded, which is utilized in the video-on-demand system for providing a plurality of video data simultaneously through a network in response to requests from a plurality of user terminals.

2. Description of the Background Art

As a conventional multiplexed video data reading device for reading a plurality of video data simultaneously, there has been a proposition of a video library system as disclosed in Japanese Patent Application Laid Open No. 4-269087 (1992). FIG. 1 shows a configuration of such a conventional video library system, in which a disk device DK101 is connected with a plurality of buffer memories BM101, BM102, . . . , BM132 through a switch SW101, where all of these elements are operated under a control of a control device CN101. Here, the buffer memories BM101, BM102, . . . , BM132 are provided within terminals TE101, TE102, . . . , TE132 which also include decoders DE101, DE102, . . . , DE132, and monitors TV101, TV102, . . . , TV132, respectively.

In this conventional video library system of FIG. 1, the multiplexed reading operation is controlled according to the timing chart of FIG. 2 as follows.

The control device CN101 generates a control time-slot sequence CTS101 formed by periodic 32 time-slots TS101, TS102, . . . , TS132 constituting one period, and within each period, different video data are read out from the disk device DK101 at different time-slots in such a manner that the video data for the buffer memory BM101 of the first terminal TE101 is read out at the time-slot TS101, the video data for the buffer memory BM102 of the second terminal TE102 is read out at the time-slot TS102, and so on. Accordingly, the transfer target of the video data read out from the disk device DK101 is sequentially switched by the switch SW101 among the buffer memories BM101, BM102, . . . , BM132. The video data received at the buffer memories BM101, BM102, . . . , BM132 are then decoded into video signals by the respective decoders DE101, DE102, . . . , DE132 and displayed by the respective monitors TV101, TV102, . . . , TV132, so as to realize the multiplexed video display at a plurality of terminals TE101, TE102, . . . , TE132.

As shown in FIG. 2, in this conventional video library system, in response to the video data reading request from each terminal, an idle time-slot not occupied by the other terminals is searched out in each period of the control time-slot sequence, and thereafter the reading of the requested video data is carried out periodically by using the searched out time-slot in each period of the control time-slot sequence. Consequently, there has been a waiting period for the video data reading operation between a time at which the video data reading request has arrived and a time at which the idle time-slot is found in the control time-slot sequence. Here, the response time required from a time at which the video data reading request is made to a time at which the reading of the requested video data from the disk device DK101 is actually completed for the first time-slot part becomes worst when there is only one idle time-slot in one period of the control time-slot sequence and the video data reading request arrives immediately after that idle time-slot, in which case the waiting period is as long as the duration of one period in the control time-slot sequence.

For example, in FIG. 2, consider a case in which the n-th terminal issued the video data reading request REQ101 at a timing of the completion of the time-slot TS132. First, the idle time-slot is searched among the following time-slots for one period starting from that timing. Here, suppose that the time-slots TS101 to TS131 are already occupied and only the time-slot TS132 is idle. Then, The video data reading request REQ101 is going to be allocated to this time-slot TS132, so that the execution of the video data reading operation must wait until this time-slot TS132 in the next period. In this case, the monitor display start timing RES101 at the n-th terminal is delayed from the timing of the video data reading request REQ101 by exactly one period part as indicated in FIG. 2 as TIME101. When a number of time-slots in one period is 32 and a duration of each time-slot is 125 ms, the duration of this delay time TIME101 amounts to 4 sec.

In such a conventional multiplexed video data reading scheme, in order to shorten the worst response time, it has been necessary to shorten the duration of one period by shortening the duration of each time-slot.

On the other hand, at the boundary of the adjacent time-slots in the time division multiplexed data reading control scheme, in general, there is an overhead time required for switching the data to be read out at the data storage device side. For example, in a case of using the magnetic disk device as the data storage device, there is a need to switch the reading target block on the disk, and there is an overhead time due to the head seek and the sector search for this purpose. Consequently, when the duration of each time-slot is shortened, a rate of the actual data reading time within each time-slot is going to be relatively lowered, and this in turn reduces the effective average data reading speed at the data storage device.

For example, when the overhead time is constantly 50 ms, for the time-slot with a duration of 125 ms, the reading efficiency at the disk device is going to be 60% (=(125–50)/125), but when the duration of the time-slot is shortened to 62.5 ms, the reading efficiency at the disk device is going to be lowered to 20% (=(62.5–50)/62.5), so that the average data reading speed is going to be reduced to ⅓.

Thus, in the conventional multiplexed video data reading scheme, there has been a problem that, when each time-slot is shortened in order to shorten the worst response time, the average data reading speed at the data storage device is lowered in turn, and as a result the possible level of multiplexing is going to be lowered.

In addition, in the conventional video library system, each terminal is given no information concerning the video data contents, so that in order to distinguish the video data having similar attributes such as the video data having similar titles, it has been necessary for each terminal to carry out an operation to actually make an access to a center to read out these video data and confirm their contents.

SUMMARY OF THE INVENTION

It is therefore an object of the present invention to provide a video library system capable of shortening the worst response time with respect to each video data reading request, without lowering the possible level of multiplexing.

It is another object of the present invention to provide a video library system capable of displaying a complete video data at a terminal even when the video data provided from a center has some skipping video segments from a top section of the video data.

It is another object of the present invention to provide a video library system capable of confirming each video data at a terminal side without requiring an access to a center to read out the entire video data.

According to one aspect of the present invention there is provided an apparatus for multiplexed video data reading, comprising: N data storage means for distributedly storing video data divided into segments, where each segment is capable of being read out in one time-slot and N is an integer greater than one; N switch means, provided in correspondence to said N data storage means, for selectively connecting each data storage means with one of a plurality of data transfer targets; and a control device for generating N control time-slot sequences formed by periodic time-slots in correspondence to said N data storage means with mutually displaced phases in each period of said N control time-slot sequences, and controlling said N data storage means and said N switch means such that, in response to a request for reading one video data from one data transfer target, an earliest available idle time-slot is selected from said N control time-slot sequences, and the segments of said one video data are sequentially read out from said N data storage means at time-slots corresponding to said earliest idle time-slot in said N control time-slot sequences and transmitted to said one data transfer target as said N data storage means are sequentially switched to said one data transfer target by said N switch means.

According to another aspect of the present invention there is provided a method of multiplexed video data reading, comprising the steps of: distributedly storing video data divided into segments among N data storage means, where each segment is capable of being read out in one time-slot and N is an integer greater than one; selectively connecting each data storage means with one of a plurality of data transfer targets by N switch means provided in correspondence to said N data storage means; generating N control time-slot sequences formed by periodic time-slots in correspondence to said N data storage means with mutually displaced phases in each period of said N control time-slot sequences; and controlling said N data storage means and said N switch means such that, in response to a request for reading one video data from one data transfer target, an earliest available idle time-slot is selected from said N control time-slot sequences, and the segments of said one video data are sequentially read out from said N data storage means at time-slots corresponding to said earliest idle time-slot in said N control time-slot sequences and transmitted to said one data transfer target as said N data storage means are sequentially switched to said one data transfer target by said N switch means.

Other features and advantages of the present invention will become apparent from the following description taken in conjunction with the accompanying drawings.

DETAILED DESCRIPTION OF THE PREFERRED EMBODIMENTS

Now, the embodiments of the video library system according to the present invention will be described in detail.

Figure 1:
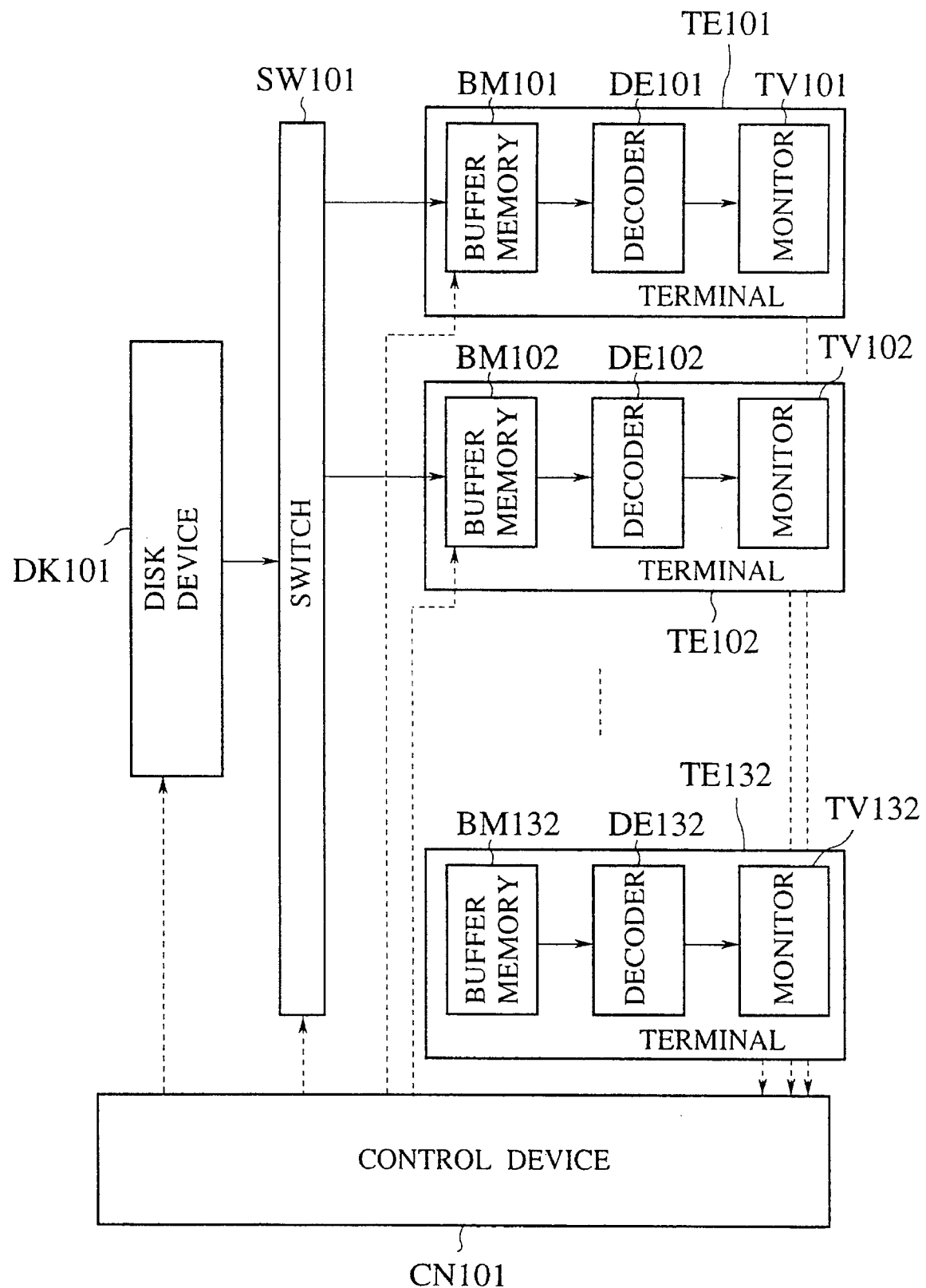
FIG. 1 is a schematic block diagram of a conventional apparatus for multiplexed video data reading in a video library system.
Figure 2:
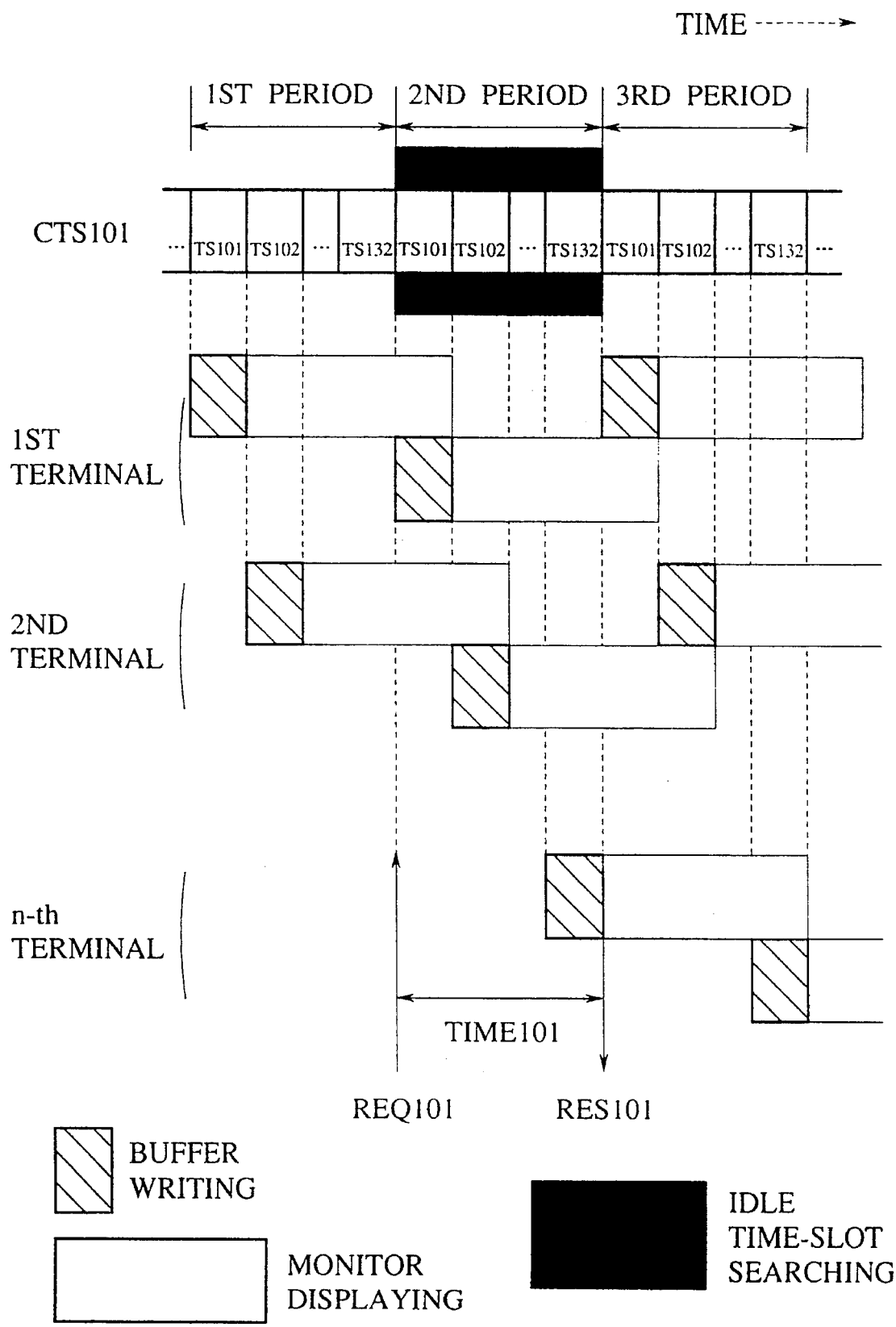
FIG. 2 is a timing chart for an exemplary multiplexed video data reading operation in the conventional apparatus of FIG. 1.
Figure 3:
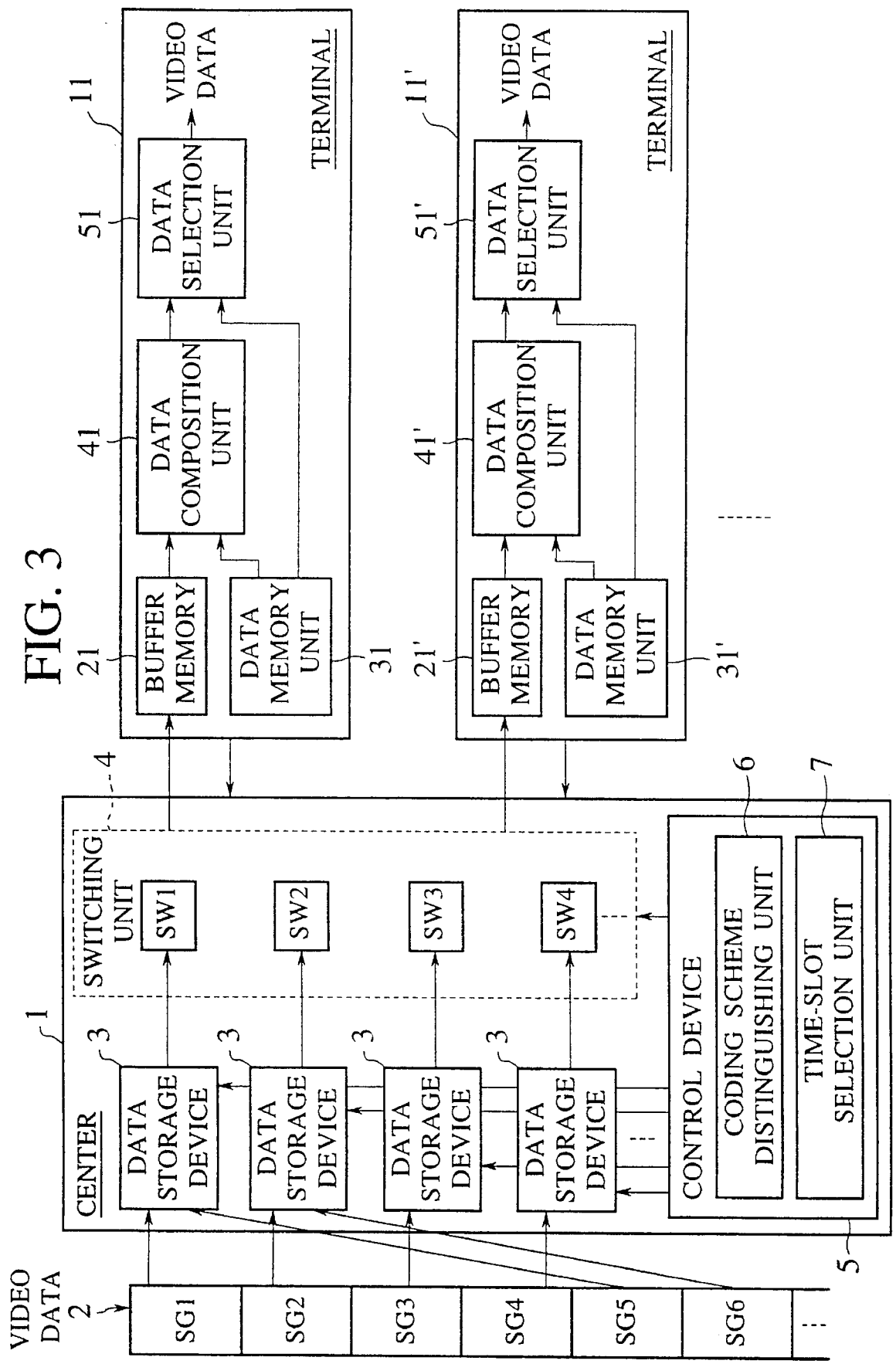
FIG. 3 is a schematic block diagram of an overall configuration of a video library system according to the present invention.

First, the video library system of the present invention has an overall configuration as shown in FIG. 3, which generally comprises a center 1 and a plurality of terminals 11, 11', etc. Here, the center 1 includes a plurality of data storage devices 3 for storing video data 2, a switching unit 4 for switching connections between the data storage devices 3 and the terminals 11, 11', etc., and a control device 5 equipped with a coding scheme distinguishing unit 6 and a time-slot selection unit 7. On the other hand, the terminal 11 includes a buffer memory 21 for receiving the video data transmitted from the center 1, a data memory unit 31 for storing a partial video data for each video data 2, a data composition unit 41 for composing the complete video data from the received video data in the buffer 21 and the partial video data in the data memory unit 31, and a data selection unit 51 for selectively outputting either the complete video data obtained by the data composition unit 41 or the partial video data stored in the data memory unit 31. Each of the other terminals 11', etc. also includes the similar elements.

In this video library system of FIG. 3, a plurality of data storage devices 3 are provided while each video data 2 is divided into segments such that each segment can be read out in one time-slot at each data storage device 3, and the divided segments of each video data 2 are stored by being distributed among the plurality of data storage devices 3. On the other hand, the switching unit 4 includes a plurality of switches SW1, SW2, etc. in correspondence to the plurality of data storage devices 3 such that each data storage device 3 can be connected with any desired terminal 11.

Then, in order to control the reading of the distributedly stored video data, a plurality of time-slot sequences having an identical period are generated by the control unit 5 in correspondence to the plurality of the data storage device 3, where these time-slot sequences have mutually displaced phases within each period. In response to the video data reading request from each terminal, the earliest unused idle time-slot is selected from all the time-slot sequences, and the video data reading operation for the requested video data is carried out under the control of the control unit 5, starting from the data storage device 3 corresponding to the time-slot sequence containing the selected time-slot, by using the selected time-slot in each time-slot sequence, while appropriately controlling the switches of the switching unit 4 by the control unit 5 to transmits the video data sequentially read out from the plurality of data storage devices 3 to the requesting terminal.

Thus, in this video library system of FIG. 3, the time division multiplexed reading of a plurality of video data is realized by operating a plurality of sets of the data storage devices and the switches to read out the video segments in parallel, and composing the video data from the read out video segments at the buffer memory of each terminal. Here, the video data reading operation for any video data can be started by using any available set of the data storage device and the switch at each period, provided that the skipping of some video segments at a top section of the video data is tolerated. In this manner, it is possible to search the idle time-slot from all of the plurality of time-slot sequences in mutually displaced phases, in parallel. In this case, the idle time-slot can be found within each phase of each period, so that the worst response time can be shortened to be equal to the duration of each phase of the period of the time-slot sequences.

As for the possible skipping of some video segments at a tope section of the video data, which occurs in a case the video data reading operation is started from the video segment other than the top video segment, for as many as (a number N of data storage devices–1) pieces of video segments at most, each terminal 11 is provided with the data memory unit 31 for storing the partial video data covering at least the maximum possibly skipped video segments of each video data, which can be utilized for compensating the actually skipped video segments in the video data received from the center in composing the complete video data at the data composition unit 41.

This partial video data of each video data stored in the data memory unit 31 of each terminal 11 can also be utilized in confirming each video data at the terminal side, so that each terminal 11 also has a data selection unit 51 capable of selectively outputting the partial video data stored in the data memory unit 31.

On the other hand, the skipping of the video segments can cause a serious problem in a case of using the coding scheme in which the other frame data referencing range at a time of each frame decoding is variable and not necessarily closed within one segment, such as the H. 261 coding, because the skipped video segments can affect the decoding of the other not skipped video segments as well.

For this reason, the control unit 5 is equipped with the coding scheme distinguishing unit 6 which distinguishes the coding scheme in which the other frame data referencing range at a time of each frame decoding is always closed within one segment and the coding scheme in which the other frame data referencing range at a time of each frame decoding is not necessarily closed within one segment, and the time-slot selection unit 7 for selectively switching the idle time-slot selection rules according to the coding schemes. Here, the coding scheme distinguishing unit 6 can easily distinguish the coding scheme by reading out the information in the header portion of the communication data for example.

As a result, the idle time-slot is selected from any of the plurality of time-slot sequences in a case of the coding scheme in which the other frame data referencing range at a time of each frame decoding is always closed within one segment, so as to realize the shortening of the response time, while the idle time-slot is selected only from the time-slot sequence corresponding to the data storage device storing the first segment in a case of the coding scheme in which the other frame data referencing range at a time of each frame decoding is not necessarily closed within one segment, so as to prevent the skipping of the video segments from the top section of each video data.

Now, the embodiments illustrating various aspects of this video library system of FIG. 3 separately will be described.

Figure 4:
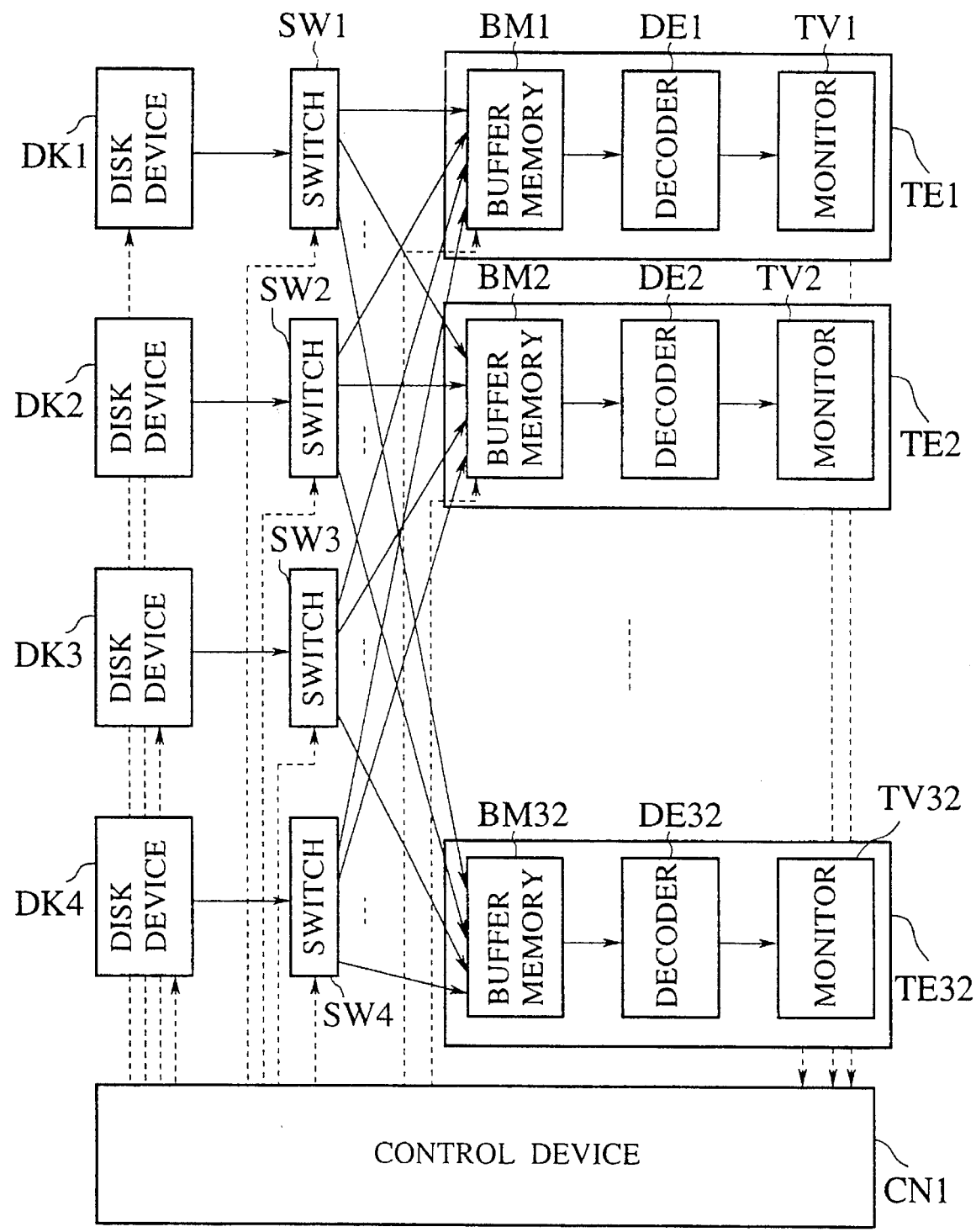
FIG. 4 is a schematic block diagram of the first embodiment of an apparatus for multiplexed video data reading in a video library system according to the present invention.

FIG. 4 shows a configuration of the first embodiment of the apparatus for multiplexed video data reading according to the present invention, in which a plurality (four in this embodiment) of disk devices DK1, DK2, DK3, and DK4 such as the magnetic disk devices are connected with a plurality of switches SW1, SW2, SW3, and SW4, respectively. Each of these switches SW1 to SW4 is also connected with 32 buffer memories BM1 to BM32 provided within 32 terminals TE1 to TE32 which also include decoders DE1 to DE32 and monitors TV1 to TV32, respectively. The operations of the disk devices DK1 to DK4, the switches SW1 to SW4, and the buffer memories BM1 to BM32 are controlled by a control device CN1.

Figure 5:
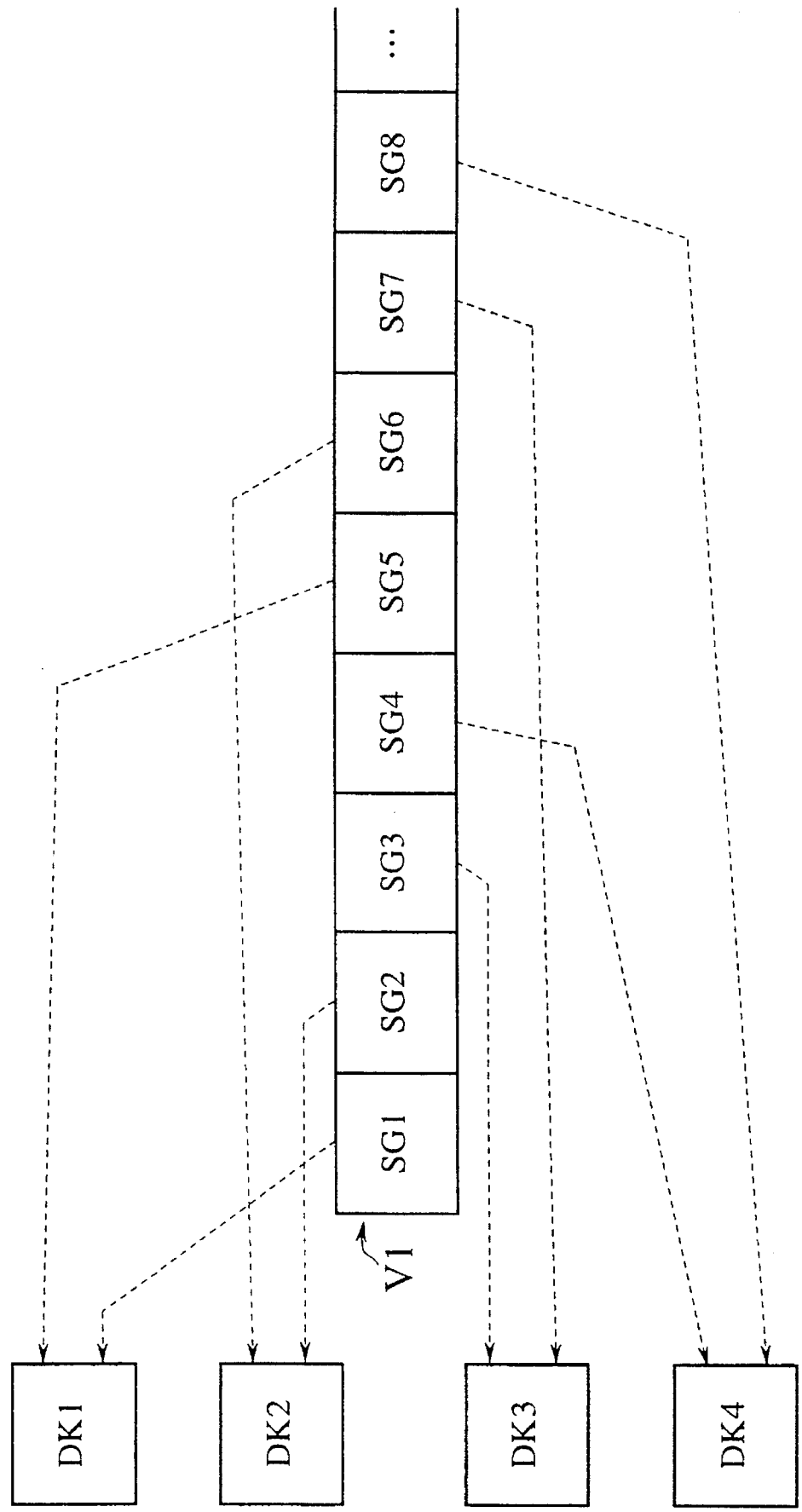
FIG. 5 is a diagram for explaining a manner of storing video segments of each video data into a plurality of disk devices in the apparatus of FIG. 4

As shown in FIG. 5, in this first embodiment, each compression coded video data V1 is divided into segments SG1, SG2, etc., such that each segment can be read out in one time-slot at each data storage device, and these divided segments are stored by being sequentially distributed among the plurality of data storage devices DK1 to DK4 in a manner indicated in FIG. 5. Namely, the disk device DK1 stores the segments SG1, SG5, . . . , SG(4k+1), . . . , the disk device DK2 stores the segments SG2, SG6, . . . , SG(4k+2), . . . , the disk device DK3 stores the segments SG3, SG7, . . . , SG(4k+3), . . . , and the disk device DK4 stores the segments SG4, SGS, . . . , SG(4k+4), . . . , where k=0, 1, 2, . . . .

In this first embodiment, the multiplexed reading operation is controlled according to the timing chart of FIG. 6 as follows.

The control device CN1 generates a plurality (four in this embodiment) of control time-slot sequence CTS1, CTS2, CTS3, and CTS4, each of which is formed by periodic 32 time-slots TS1, TS2, . . . , TS32 constituting one period, in correspondence to four sets of the disk device and switch combination DK1-SW1, DK2-SW2, DK3-SW3, and DK4-SW4. Here, as shown in FIG. 6, each period is divided into four phases with 8 time-slots in each phase, and four control time-slot sequences have mutually displaced phases such that the control time-slot sequence CTS2 is displaced from the control time-slot sequence CTS1 by one phase, the control time-slot sequence CTS3 is displaced from the control time-slot sequence CTS2 by one phase, and the control time-slot sequence CTS4 is displaced from the control time-slot sequence CTS3 by one phase.

Then, the control device CN1 controls each combination of the disk device and the switch to carry out the reading of an appropriate video segment and the transfer of the read out video segment to an appropriate buffer memory. Here, in the four control time-slot sequences, the time-slots of the same time-slot number are used for reading the video segments of the same video data and transferring the read out video segments to the same buffer memory.

For example, when the first segment SG1 of a certain video data is read out and its transfer target is switched to a certain buffer memory BMk (k=1 to 32) by using the combination DK1-SW1 at the time-slot TS1 of the control time-slot sequence CTS1, the second segment SG2 of the same video data is read out and its transfer target is switched to the same buffer memory BMk by using the combination DK2-SW2 at the same time-slot TS1 of the control time-slot sequence CTS2, the third segment SG3 of the same video data is read out and its transfer target is switched to the same buffer memory BMk by using the combination DK3-SW3 at the same time-slot TS1 of the control time-slot sequence CTS3, the fourth segment SG4 of the same video data is read out and its transfer target is switched to the same buffer memory BMk by using the combination DK4-SW4 at the same time-slot TS1 of the control time-slot sequence CTS4, and so on.

In this manner, the video segments of each video data are read out and written into a certain buffer memory BMk by using the combinations of the disk device and the switch sequentially. At the buffer memory BMk, the sequentially entered video segments are sequentially supplied to the decoder DEk of the same terminal TEk, at which each video segment is decoded into the video signals. The decoded video signals are then sequentially supplied to the monitor TVk of the same terminal TEk to provide the display according to the video data.

Here, the video signals contained in one video segment corresponds to the duration of the phase difference between the successive control time-slot sequences, so that before the video display of one video segment part is completed, the reading, the buffer memory writing, and the decoding of the next video segment are completed, such that the next video signals can be supplied to the monitor before the end of the video display of the previous video segment part, so as to realize the continuous video display. In this first embodiment, the period of each control time-slot sequence has 32 time-slots, so that the independent video display can be provided at the monitors of up to 32 terminals simultaneously.

Figure 6:
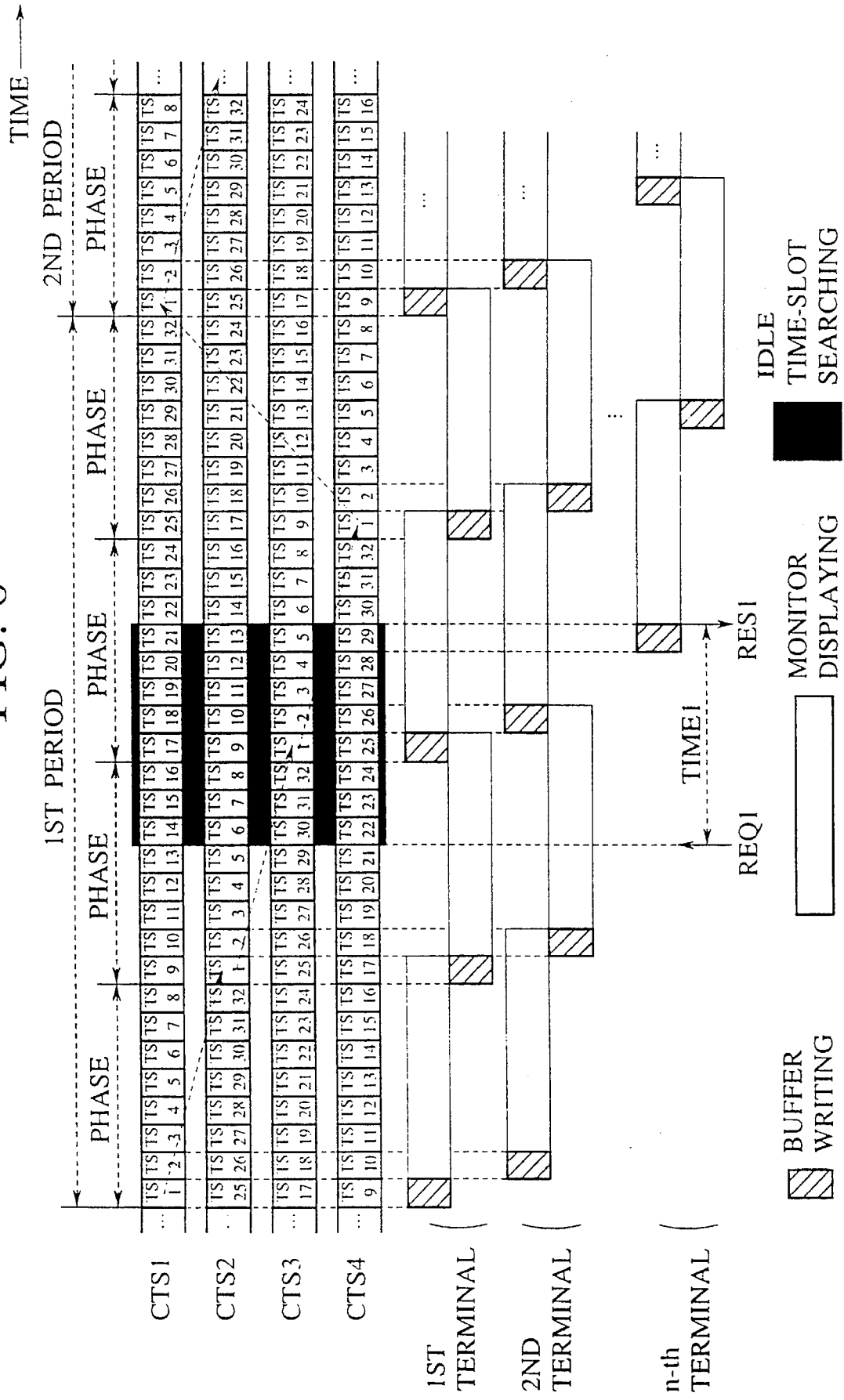
FIG. 6 is a timing chart for an exemplary multiplexed video data reading operation in the apparatus of FIG. 4.

In FIG. 6, when a video data reading request REQ1 is received from the n-th terminal, the idle time-slot is searched out in all of the four control time-slot sequences CTS1, CTS2, CTS3, and CTS4 starting from that moment, and the earliest idle time-slot found in any one of these four control time-slot sequences is used to start out the video data reading operation of the requested video data. At this point, as the successive ones of these four control time-slot sequences have the phase difference of 8 time-slots, regardless of which one of the time-slots TS1 to TS32 is going to be found as idle, this idle time-slot can be found within a duration of 8 time-slots at most since the arrival of the video data reading request REQ1.

For example, when the time-slot TS21 is the only one idle time-slot among 32 time-slots TS1 to TS32 at a moment, and the video data reading request REQ1 arrived at the ending timing of this idle time-slot TS21 on the control time-slot sequence CTS4 as indicated in FIG. 6. Even in such a worst possible case, this idle time-slot TS21 can be found on the control time-slot sequence CTS1 which is separated by a duration of 8 time-slots from the time-slot TS21 on the control time-slot sequence CTS4 within the same period, and the video data reading operation for the requested video data can be started from this time-slot TS21 on the control time-slot sequence CTS1, so that the worst response time in this case is the duration of 8 time-slots which is equal to the phase difference between the successive control time-slot sequences.

Now, when the idle time-slot is selected from the control time-slot sequence CTS2 corresponding to the combination DK2-SW2 for example, the video data reading operation is going to start out from the video segment SG2 stored in the disk device DK2, and the first video segment SG1 stored in the disk device DK1 is going to be skipped. Similarly, when the idle time-slot is selected from the control time-slot sequence CTS3 or CTS4, the video segments SG1 and SG2 or SG1, SG2, and SG3 are going to be skipped. Thus, depending on the control time-slot sequence from which the idle time-slot is to be selected, at most (a number N of disk devices−1) video segments are going to be skipped from a top section of the read out video data.

Here, if one video segment provide 1 second of display, the maximum top skipped part corresponds to 3 seconds of display in this first embodiment. However, this much of skipped part can be easily concealed in the actual video display by taking an appropriate measure in the video data production side, such as a measure which demands the repetition of the title image for the first 4 seconds in each video data for instance.

Alternatively, it is also possible to compensate this skipping of the video segments from a top section of each video data at the terminal side, as will be described as the next second embodiment.

Figure 7:
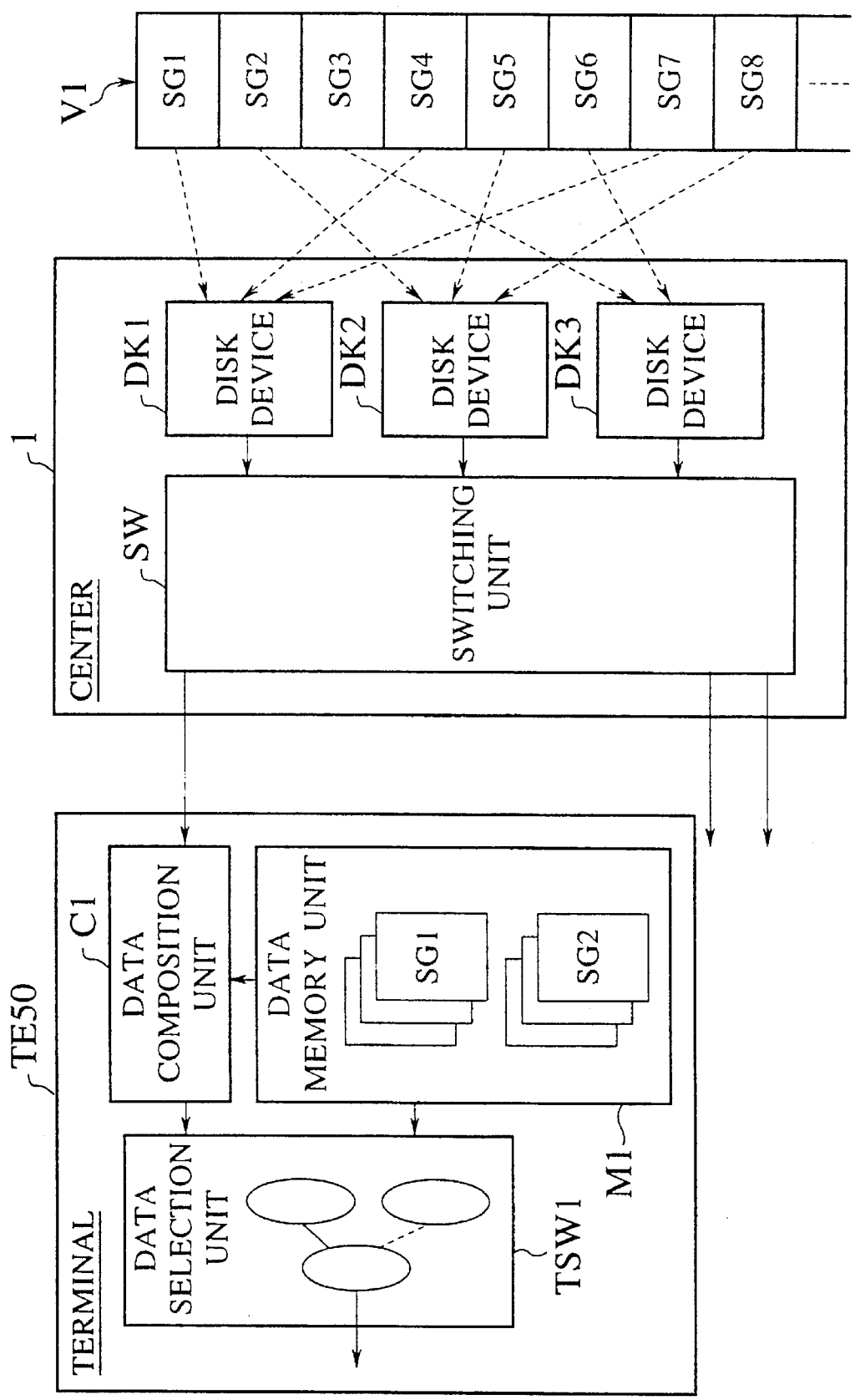
FIG. 7 is a schematic block diagram of the second embodiment of an apparatus for multiplexed video data reading in a video library system according to the present invention.

FIG. 7 shows a configuration of the second embodiment of the apparatus for multiplexed video data reading according to the present invention, in which a plurality (three in this embodiment) of disk devices DK1, DK2, and DK3 such as the magnetic disk devices for storing the video data V1 are connected with a switching unit SW including a plurality of switches in the center 1. Each of these switches of the switching unit SW is also connected with a number of terminals TE50, where each terminal TE50 includes a data composition unit C1, a data memory unit M1, and a data selection unit TSW1.

In this configuration of FIG. 7, the maximum top skipped part corresponds to 2 video segments as there are three disk devices DK1 to Dk3. Consequently, the data memory unit M1 in the terminal TE50 stores in advance copies of the first two video segments SG1 and SG2 of each video data V1 stored at the center 1 in this case.

Then, when the entire video data is to be displayed, the data selection unit TSW1 is switched to the data composition unit C1 at which the video segments of the video data V1 transmitted from the center 1 with at most first two segments skipped are compensated by the video segments SG1 and SG2 stored in the data memory unit M1 to produce the complete video data V1 without any skipped part.

On the other hand, when the confirmation of each video data V1 alone is to be made, the data selection unit TSW1 is switched to the data memory unit M1 such that the video segments SG1 and SG2 stored in the data memory unit M1 are repeatedly displayed. It is also possible to provide a video menu by contracting the data of the stored video segments for each video data and displaying a list of the contracted video displays for all the available video data such that the user can select the desired video data to be requested to the center 1 by watching the top sections of all the available video data on this video menu.

Figure 8:
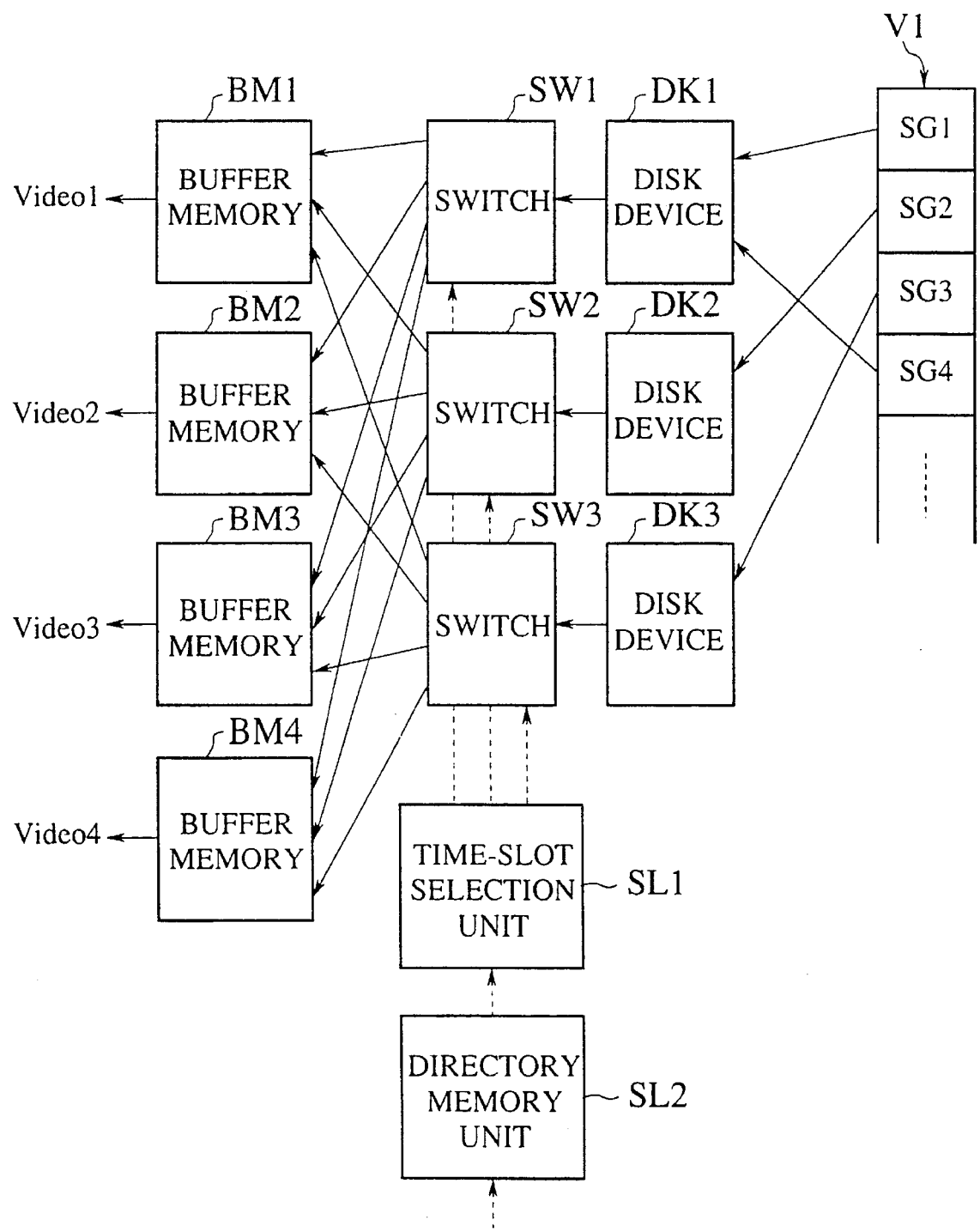
FIG. 8 is a schematic block diagram of the third embodiment of an apparatus for multiplexed video data reading in a video library system according to the present invention.

Next, FIG. 8 shows a configuration of the third embodiment of the apparatus for multiplexed video data reading according to the present invention, in which a plurality (three in this embodiment) of disk devices DK1, DK2, and DK3 such as the magnetic disk devices for storing the video data V1 are connected with a plurality of switches SW1, SW2, and SW3. Each of these switches SW1, SW2, and SW3 is also connected with a number (four in this embodiment) of buffer memories BM1, BM2, BM3, and BM4. Here, the operations of the switches SW1 to SW3 are controlled by a time-slot selection unit SL1 which is connected with a directory memory unit DR1.

In this configuration of FIG. 8, the directory memory unit DR1 stores the directory data which indicate whether each video data V1 stores in the disk devices DK1 to DK3 uses the coding scheme in which the other frame data referencing range at a time of each frame decoding is always closed within a limited range and that limited range is always within one segment, as in a case of the MPEG (Motion Picture Experts Group) coding of the ISO-11172 with the segment length set to be a positive integer multiple of GOP (Group Of Pictures) in the MPEG, or the coding scheme in which the other frame data referencing range at a time of each frame decoding is not necessarily closed within a limited range and the referencing range can possibly be stretched over more than one segments, as in a case of the H. 261 coding of the ITU-T.

Figure 9:
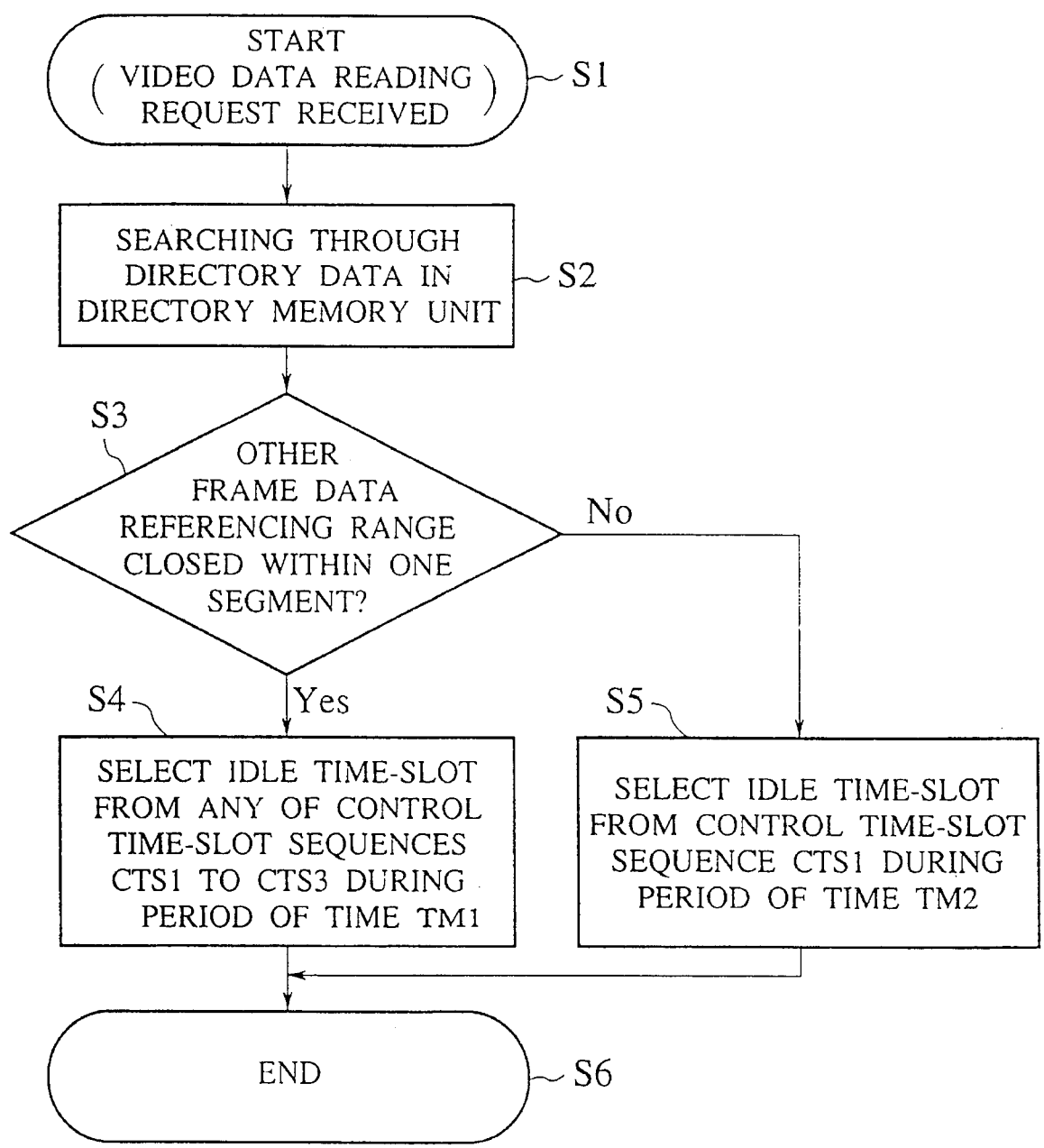
FIG. 9 is a flow chart for the operation of a time-slot selection unit in the apparatus of FIG. 8.

Then, using this directory data in the directory memory unit DR1, the time-slot selection unit SL1 operates at a time of reading out each video data V1 from the disk devices DK1 to DK3 according to the flow chart of FIG. 9, as follows. When the video data reading request for the video data V1 is received at the time-slot selection unit SL1 (step S1), the directory data stored in the directory memory unit DR1 are searched through (step S2) to judge whether the coding scheme used for the video data V1 to be read out is a coding scheme in which the other frame data referencing range at a time of each frame decoding is always closed within one segment or a coding scheme in which the other frame data referencing range at a time of each frame decoding is not necessarily closed within one segment (step S3).

In a case of the coding scheme in which the other frame data referencing range at a time of each frame decoding is always closed within one segment, just as in the first embodiment described above and as indicated in FIG. 10, the utilization state of te time-slots in the control time-slot sequences CTS1 to CTS3 corresponding to the switches SW1 to SW3 is checked during a period of time TM1 (corresponding to one phase of the period of the control time-slot sequences) covering as many time-slots as a quotient (equal to two in this embodiment) of a total number (six in this embodiment) of the periodic time-slots divided by a total number of disk devices (three in this embodiment), starting from a timing P1 at which the judgement of the coding scheme of the video data V1 to be read out is completed, and the earliest idle time-slot is selected from any of the control time-slot sequences CTS1 to CTS3 (step S4).

Figure 10:
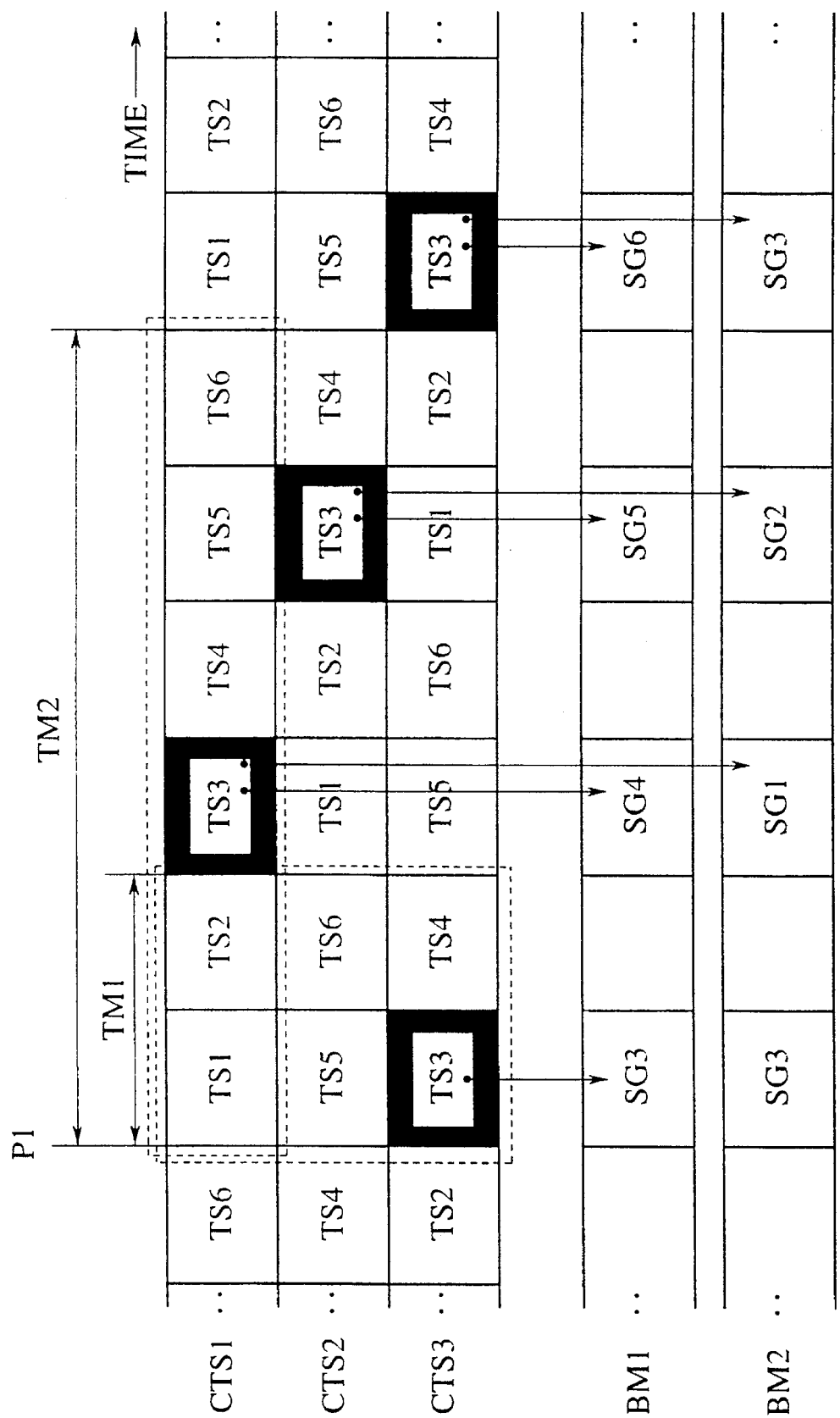
FIG. 10 is a timing chart for an exemplary multiplexed video data reading operation in the apparatus of FIG. 8.

When the time-slot TS3 on the control time-slot sequence CTS3 is selected for example, the video segments SG3, SG4, etc. of this video data V1 are sequentially read out from the disk devices DK1 to DK3, starting from the disk device DK3 corresponding to this control time-slot sequence CT3, by using the selected time-slot TS3 in each one of the control time-slot sequences CTS1 to CTS3 which appears in an cyclic order as indicated in FIG. 10. Then, the video data V1 is reconstructed at the transfer target buffer memory such as BM1 for example by composing all the video segments SG3, SG4, etc. transmitted from the disk devices DK1 to DK3 through the switches SW1 to SW3. In this case, the first two video segments SG1 and SG2 are going to be skipped, but since each video segment usually corresponds to about 1 second of video display so that the total 2 seconds of the skipped video segments at the top section of the video data can be regarded as not as much as seriously affecting the quality of the read out video data.

On the other hand, in a case of the coding scheme in which the other frame data referencing range at a time of each frame decoding is not necessarily closed within one segment, the utilization state of te time-slots in the control time-slot sequence CTS1 corresponding to the disk device DK1 which stores the first video segment SG1 is checked during a period of time TM2 (corresponding to one period of the control time-slot sequences) covering as many time-slots as a total number (six in this embodiment) of the periodic time-slots, starting from a timing P1 at which the judgement of the coding scheme of the video data V1 to be read out is completed, and the earliest idle time-slot is selected only from this control time-slot sequence CTS1 (step S5). Thus, in this case, the reading of the video segments of the video data always starts from the disk device DK1 corresponding to this control time-slot sequence CTS1 which stores the first video segment SG1, and consequently all the video segments of the requested video data can be read out without skipping any video segment.

When the time-slot TS3 on the control time-slot sequence CTS1 is selected for example, the video segments SG1, SG2, etc. of this video data V1 are sequentially read out from the disk devices DK1 to DK3, starting from the disk device DK1 corresponding to this control time-slot sequence CT1, by using the selected time-slot TS3 in each one of the control time-slot sequences CTS1 to CTS3 which appears in an cyclic order as indicated in FIG. 10. Then, the complete video data V1 is reconstructed at the transfer target buffer memory such as BM1 for example by composing all the video segments SG1, SG2, etc. transmitted from the disk devices DK1 to DK3 through the switches SW1 to SW3.

In this case of the coding scheme in which the other frame data referencing range at a time of each frame decoding is not necessarily closed within one segment, the response time is going to be at longest the period of time TM2 which may be longer than the response time up to the period of time TM1 in the above described case of the coding scheme in which the other frame data referencing range at a time of each frame decoding is always closed within one segment, bat there is going to be no skipping of the video segment in the read out video data, so that it becomes possible to prevent the serious damage on the video display for the top section of the video data due to the lack of the appropriate referencing frame data at a time of the video data decoding.

As described, according to the present invention, it is possible to secure the idle time-slot within each phase of each period which is equal to the phase difference between successive control time-slot sequences in each period, so that the worst response time can be shortened to be equal to the duration of each phase of the period of the time-slot sequences. For example, in the above described case of the first embodiment of FIGS. 4 to 6, the worst response time is as much as the duration of 8 time-slots, so that when one time-slot corresponds to 125 ms, the worst response time can be reduced from 4 seconds in the conventional case to 1 second in the first embodiment of the present invention, i.e., the worst response time can be shortened to ¼ compared with the conventional case.

In addition, the present invention does not require the shortening of each time-slot duration, so that the same average reading speed from the data storage device as in the conventional video library system can be maintained and the same level of multiplexing as in the conventional video library system can be provided while reducing the worst response time.

Moreover, according to the above described second embodiment of the present invention, it becomes possible to obtain the complete video data at the terminal side by compensating any skipped video segments at a top section of the video data by the partial video data provided on the terminal side in advance, while it also becomes possible to provide a video display of a part of each video data on the terminal side by using the same partial video data, so that the confirming of each video data can be made at the terminal side without requiring the access to the center for this purpose alone.

Furthermore, according to the above described third embodiment of the present invention, it becomes possible to dynamically change the idle time-slot selection rule According to the coding scheme of the video data to be read out, so that the fast response time can be secured for a case of the coding scheme in which the other frame data referencing range at a time of each frame decoding is always closed within one segment, while the serious damage on the video display for the top section of the video data can be prevented for a case of the coding scheme in which the other frame data referencing range at a time of each frame decoding is not necessarily closed within one segment. This third embodiment is particularly effective in a case the video data compression coded by more than one coding schemes such as the MPEG coding scheme and the H. 261 coding scheme are mixedly present.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for multiplexed video data reading, comprising:

N data storage means for distributedly storing a plurality of video data divided into segments, where each segment is capable of being read out in one time-slot and N is an integer greater than one;

N switch means, provided in correspondence to said N data storage means, for selectively connecting each data storage means with one of a plurality of data transfer targets; and a control device for generating N control time-slot sequences formed by periodic time-slots in correspondence to said N data storage means with mutually displaced phases in each period of said N control time-slot sequences, and controlling said N data storage means and said N switch means such that, in response to a request for reading one video data from one data transfer target, an earliest available idle time-slot is selected from said N control time-slot sequences, and the segments of said one video data are sequentially read out from said N data storage means at time-slots corresponding to said earliest idle time-slot in said N control time-slot sequences and transmitted to said one data transfer target as said N data storage means are sequentially switched to said one data transfer target by said N switch means.

2. The apparatus of claim 1, wherein each period of said N control time-slot sequences is divided into N phases, such that successive control time-slot sequences have a phase difference equal to one phase.

3. The apparatus of claim 1, wherein the segments of said one video data are sequentially read out starting from one data storage means corresponding to one control time-slot sequence in which said earliest available idle time-slot is selected.

4. The apparatus of claim 1, wherein the segments of the video data are distributedly stored in sequential order among said N data storage means.

5. The apparatus of claim 1, wherein the data transfer targets are buffer memories provided in terminals of a video library system while said N data storage means, said N switch means and said control device are provided in a center of the video library system.

6. The apparatus of claim 1, further comprising data memory means, provided in correspondence to each data transfer target, for storing in advance a partial video data for each video data stored in said N data storage means including a prescribed number of segments from a top section of each video data, and data composition means, provided in correspondence to each data transfer target, for composing a complete video data for each video data from the segments of each video data read out and transmitted from said N data storage means and the partial video data for each video data stored in the data memory means.

7. The apparatus of claim 6, wherein the data memory means stores at least (N–1) segments from a top section of each video data.

8. The apparatus of claim 6, further comprising data selection means, provided in correspondence to each data transfer target, for selectively outputting one of the partial video data stored by the data memory means and the complete video data composed by the data composition means.

9. The apparatus of claim 1, wherein the control device includes:

means for distinguishing a coding scheme used for each video data as either a coding scheme in which other frame data referencing range at a time of each frame decoding is always closed within one segment or a coding scheme in which other frame data referencing range at a time of each frame decoding is not necessarily closed within one segment; and means for changing an idle time-slot selection rule used by the control device according to the coding scheme distinguished by the distinguishing means, such that the earliest available idle time-slot is selected among all of said N control time-slot sequences in a case of the coding scheme in which other frame data referencing range at a time of each frame decoding is always closed within one segment, whereas the earliest available idle time-slot is selected from one control time-slot sequence corresponding to one data storage means which stores a first segment of each video data in a case of the coding scheme in which other frame data referencing range at a time of each frame decoding is not necessarily closed within one segment.

10. The apparatus of claim 9, wherein the earliest available idle time-slot is selected within as many time-slots of each of said N control time-slot sequences as a total number of periodic time-slots in each period of said N control time-slot sequences divided by N in a case of the coding scheme in which other frame data referencing range at a time of each frame decoding is always closed within one segment, whereas the earliest available idle time-slot is selected within as many time-slots in said one control time-slot sequence as a total number of periodic time-slots in each period of said one control time-slot sequence in a case of the coding scheme in which other frame data referencing range at a time of each frame decoding is not necessarily closed within one segment.

11. A method of multiplexed video data reading, comprising the steps of:

distributedly storing a plurality of video data divided into segments among N data storage means, where each segment is capable of being read out in one time-slot and N is an integer greater than one;

selectively connecting each data storage means with one of a plurality of data transfer targets by N switch means provided in correspondence to said N data storage means;

generating N control time-slot sequences formed by periodic time-slots in correspondence to said N data storage means with mutually displaced phases in each period of said N control time-slot sequences; and controlling said N data storage means and said N switch means such that, in response to a request for reading one video data from one data transfer target, an earliest available idle time-slot is selected from said N control time-slot sequences, and the segments of said one video data are sequentially read out from said N data storage means at time-slots corresponding to said earliest idle time-slot in said N control time-slot sequences and transmitted to said one data transfer target as said N data storage means are sequentially switched to said one data transfer target by said N switch means.

12. The method of claim 11, wherein at the generating step, each period of said N control time-slot sequences is divided into N phases, such that successive control time-slot sequences have a phase difference equal to one phase.

13. The method of claim 11, wherein at the controlling step, the segments of said one video data are sequentially read out starting from one data storage means corresponding to one control time-slot sequence in which said earliest available idle time-slot is selected.

14. The method of claim 11, wherein at the storing step, the segments of the video data are distributedly stored in sequential order among said N data storage means.

15. The method of claim 11, wherein at the selectively connecting step, the data transfer targets are buffer memories provided in terminals of a video library system while said N data storage means and said N switch means are provided in a center of the video library system.

16. The method of claim 11, further comprising the steps of:

additionally storing in advance a partial video data for each video data stored in said N data storage means including a prescribed number of segments from a top section of each video data by data memory means provided in correspondence to each data transfer target; and composing a complete video data for each video data from the segments of each video data read out and transmitted from said N data storage means and the partial video data for each video data stored in the data memory means by data composition means provided in correspondence to each data transfer target.

17. The method of claim 16, wherein at the additionally storing step, the data memory means stores at least (N−1) segments from a top section of each video data.

18. The method of claim 16, further comprising the step of selectively outputting one of the partial video data stored by the data memory means and the complete video data composed by the data composition means.

19. The method of claim 11, further comprising the steps of:

distinguishing a coding scheme used for each video data as either a coding scheme in which other frame data referencing range at a time of each frame decoding is always closed within one segment or a coding scheme in which other frame data referencing range at a time of each frame decoding is not necessarily closed within one segment; and changing an idle time-slot selection rule used at the controlling step according to the coding scheme distinguished at the distinguishing step, such that the earliest available idle time-slot is selected among all of said N control time-slot sequences in a case of the coding scheme in which other frame data referencing range at a time of each frame decoding is always closed within one segment, whereas the earliest available idle time-slot is selected from one control time-slot sequence corresponding to one data storage means which stores a first segment of each video data in a case of the coding scheme in which other frame data referencing range at a time of each frame decoding is not necessarily closed within one segment.

20. The method of claim 19, wherein at the controlling step, the earliest available idle time-slot is selected within as many time-slots of each of said N control time-slot sequences as a total number of periodic time-slots in each period of said N control time-slot sequences divided by N in a case of the coding scheme in which other frame data referencing range at a time of each frame decoding is always closed within one segment, whereas the earliest available idle time-slot is selected within as many time-slots in said one control time-slot sequence as a total number of periodic time-slots in each period of said one control time-slot sequence in a case of the coding scheme in which other frame data referencing range at a time of each frame decoding is not necessarily closed within one segment.

* * * * *